G. L. ANDERSON.
TRAY TURNER.
APPLICATION FILED JAN. 14, 1920.

1,344,932.

Patented June 29, 1920.

INVENTOR.
Gust L. Anderson
BY
Francis G. Huebner,
ATTORNEYS.

UNITED STATES PATENT OFFICE.

GUST L. ANDERSON, OF FRESNO, CALIFORNIA.

TRAY-TURNER.

1,344,932.      Specification of Letters Patent.     Patented June 29, 1920.

Application filed January 14, 1920. Serial No. 351,272.

*To all whom it may concern:*

Be it known that I, GUST L. ANDERSON, a citizen of the United States, and resident of Fresno, in the county of Fresno and the State of California, have invented a new and useful Improvement in Tray-Turners, of which the following is a specification.

My invention relates to a new and novel device for turning fruit drying trays. In the raisin producing countries it is well known that the raisin grapes when picked are placed on trays which are laid in the sun to dry, and when the grapes are partially dried on one side they are turned over so that the portions of the grapes not theretofore exposed to the sun are turned to the top. This is accomplished by placing a duplicate tray on the top of the tray containing grapes to be turned, a man at each end grasps the two trays, and by their united effort turn them over. The tray then on the top is removed and the grapes are left on the new tray in the reverse position from what they were before the turning was done.

Figure 1:
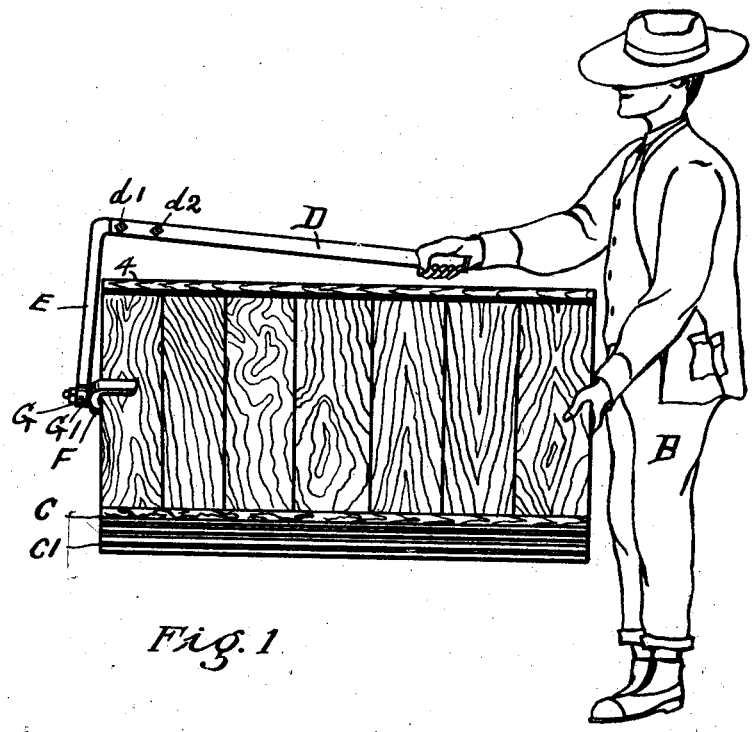
Figure 2:
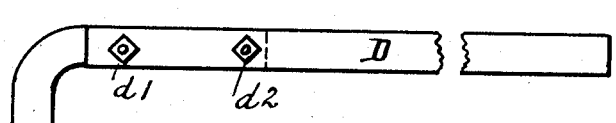
Figure 3:
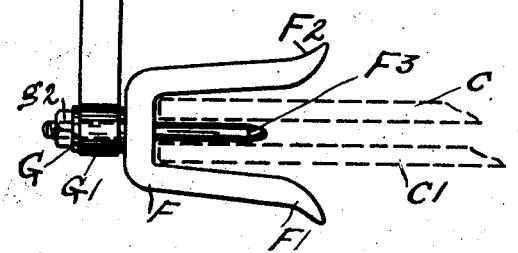
Figure 3:
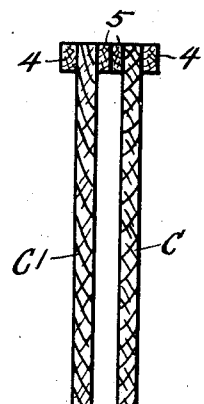

The object of my invention is to provide a tool whereby one man can easily and thoroughly perform the work heretofore done by two men in turning trays, and more specifically to produce a device mounted on a swivel which will readily grasp and clamp two trays together at one end, and which can be readily released when the trays are turned over. I accomplish these and other objects by means of the device hereinafter described and illustrated in the accompanying drawing in which Figure 1 shows the tool in actual use in the turning of a pair of trays by a workman. Fig. 2 is an enlarged isometric view of the device. Fig. 3 shows an end view of two trays in a vertical position.

In said drawing B represents the workman using the tool, C and $C^1$ are two trays, $C^1$ being the tray which contained the grapes before they were turned, and C representing the tray upon which the grapes are being turned. It will be noted that cleats 4 and 5 are on two sides of the tray.

The tool which I have invented consists of a handle D, a right angle extension E which can be fastened to handle D with bolts $d^1$ and $d^2$. The lower end of extension E terminates in a bearing $G^1$ in which a swivel G can operate. To the swivel is attached a forked member F. $F^3$ is the center tine which is constructed straight and round and is adapted to extend at approximately right angles to extension E. $F^1$ and $F^2$ are outside tines on opposite sides of tine $F^3$ and are spaced therefrom at the end adjacent to the swivel so the space between the center tine and the outside tines will be approximately the same as the thickness of the board $C^3$ forming the bottom of tray. The space between the tines gradually increases from the shoulder of the fork toward the outside end, and at the outside end they flare in a curved line outwardly. This tine is for the purpose of easily engaging it with the trays.

In using this device an empty tray is inverted over the tray to be turned, the forked member is placed so that the center tine is between the trays at the ends having no cleats, and the outside tines are passed on the outside of the trays. By pulling the handle D, the forked member F will clamp the two trays together at one end with the center tine $F^3$ between the trays. The workman can hold the other ends of the trays together, raise them from the ground, and by a twisting motion turn the trays half way around, lay them on the ground, remove the tray then on the top and go to the next full tray to proceed as before. The extension E should be long enough to permit the tray to swing under handle D as shown in Fig. 1.

I claim as new and ask for Letters Patent:

1. In a device of the character described the combination of a handle having a portion bent at right angles thereto, a clamp attached at one end of the handle by a swivel, said clamp consisting of a fork having a shoulder and three tines, spaced so they are wider apart at the outside ends than at the shoulder.

2. In a tray turner, the combination of a handle and a three pronged fork attached to the handle with a swivel adapted to hold the fork at approximately right angles to the portion of the handle adjacent to the fork, and to turn on an axis in line with the middle prong of said fork.

3. In a tray turner the combination of a fork having three prongs spaced so that they are nearer together at the shoulder of the fork than at the outside ends of said prongs, said fork being attached to a handle with a swivel which permits the fork to turn on an axis in line with the middle prong, said handle extending at right angles to said middle prong, and having a portion at the end opposite the swivel bent so that it will be parallel to said middle prong, substantially as described.

GUST L. ANDERSON.

Witnesses:
CLEO K. CURTIS,
A. A. HUEBNER.